United States Patent
Shah et al.

(10) Patent No.: US 10,114,846 B1
(45) Date of Patent: Oct. 30, 2018

(54) BALANCED DISTRIBUTION OF SORT ORDER VALUES FOR A MULTI-COLUMN SORT ORDER OF A RELATIONAL DATABASE

(71) Applicant: Amazon Technologies, Inc., Seattle, WA (US)

(72) Inventors: Mehul Shah, Saratoga, CA (US); Jakub Kulesza, Bellevue, WA (US); James Thomas Kiraly, Seattle, WA (US); Benjamin Albert Sowell, Mountain View, CA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 15/192,945

(22) Filed: Jun. 24, 2016

(51) Int. Cl.
  *G06F 17/30* (2006.01)
(52) U.S. Cl.
  CPC .. *G06F 17/30306* (2013.01); *G06F 17/30315* (2013.01); *G06F 17/30988* (2013.01)
(58) Field of Classification Search
  CPC .................................................. G06F 17/30306
  See application file for complete search history.

(56) References Cited

U.S. PATENT DOCUMENTS

| | | | |
|---|---|---|---|
| 5,870,752 A | 2/1999 | Gibbons et al. | |
| 5,987,468 A | 11/1999 | Singh et al. | |
| 5,995,957 A * | 11/1999 | Beavin | G06F 17/30469 |
| 6,763,359 B2 | 7/2004 | Lohman et al. | |
| 2009/0006399 A1* | 1/2009 | Raman | G06F 17/30498 |
| 2010/0080459 A1 | 4/2010 | Dai et al. | |
| 2010/0185692 A1* | 7/2010 | Zhang | G06F 17/30327 |
| | | | 707/803 |
| 2012/0117054 A1* | 5/2012 | Shrinivas | G06F 17/30454 |
| | | | 707/713 |
| 2013/0166568 A1* | 6/2013 | Binkert | G06F 17/30911 |
| | | | 707/741 |

(Continued)

OTHER PUBLICATIONS

Phillip B. Gibbons, et al., "Fast Incremental Maintenance of Approximate Histograms", ACM Transactions on Database Systems, vol. V, No. N, 2002, pp. 1-33.

(Continued)

*Primary Examiner* — Mahesh H Dwivedi
(74) *Attorney, Agent, or Firm* — Robert C. Kowert; Meyertons, Hood, Kivlin, Kowert & Goetzel, P.C.

(57) ABSTRACT

A balanced distribution of sort order values may be implemented for a multi-column sort order of a database table. Columns of the database table to be included in the multi-column sort order may be identified. Some columns containing string data values may be converted to equally-sized integer data values. The data values of columns may be evaluated to determine buckets representing the ranges of data values within the columns for depth-balanced histograms of the columns. Multi-column sort order values may be generated for individual entries in the database table according to bucket values assigned to the buckets that include the columns values of the individual entries. The entries of the database table may then be stored according to a sorted ordering of multi-column sort order values for the entries.

20 Claims, 11 Drawing Sheets

(56) References Cited

U.S. PATENT DOCUMENTS

2015/0032684 A1* 1/2015 Gupta .............. G06F 17/30575
                                                        707/600
2016/0210329 A1* 7/2016 Bortoletto ......... G06F 17/30469

OTHER PUBLICATIONS

U.S. Appl. No. 13/742,287, filed Jan. 15, 2013, Anurag Windlass Gupta.
U.S. Appl. No. 15/269,934, filed Sep. 19, 2016, Jeffrey Davis, et al.

* cited by examiner

BALANCED DISTRIBUTION OF SORT ORDER VALUES FOR A MULTI-COLUMN SORT ORDER OF A RELATIONAL DATABASE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management. Sort ordering techniques, for instance, offer database users opportunities to improve the performance of queries against large sets of data by organizing data according to a sort order.

Figure 1A:
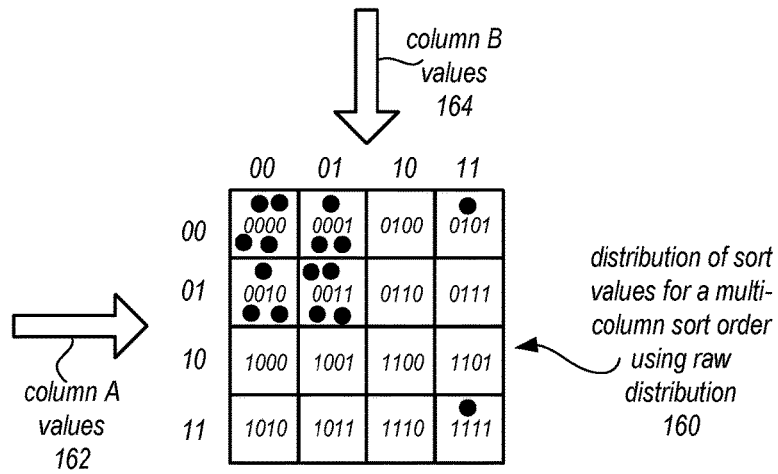
FIG. 1A illustrates a distribution of sort order values for a multi-column sort order based on raw column values, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of balanced distribution of sort order values for a multi-column sort order are described herein. A data store, such as a data warehouse system, or other data storage system may implement database tables according to many different formats, such as row-oriented formats and/or column-oriented formats (which may be referred to as "columnar database tables") of relational database tables or various kinds of non-relational database tables, such as key-value stores, in order to provide efficient data management for clients. Typically, data in the database table may be sorted according to one column of the database table, such as by date. Queries to the database table that include predicates directed to the sort order column may be efficiently processed, as mapping information or other metadata describing the ranges of data (according to the values in the sort order column) stored within particular storage locations can be used to identify which storage locations to read in order to service a query.

Similarly, a multi-column sort order can provide query processing benefits without being based on a single column. Instead of sorting data values according to the value of a single column in the relational database table, entries in the database table may be sorted according to a multi-column sort order value that is generated based on the values of multiple columns included in the sort order. Thus if a query is directed toward one or more of the multiple columns included in the sort order, identifying storage locations to read may be efficiently performed because the relational database table may be sorted according to the multi-column sort order.

A multi-column sort order may be generated based on an interleaving technique that interleaves data bits from the columns that make up the multi-column sort order. However, interleaving the bit values directly from the raw column values may be susceptible to uneven or skewed data values, which may prevent the multi-column sort order values from being efficiently searched (as not all bits used to create the multi-column sort order values may be as selective). Consider FIG. 1A, raw column values for two columns, column A and column B, that make up a multi-column sort order for a database table may not be evenly distributed across the possible set of multi-column sort values. Note that raw column A values 162 and raw column B values 164 may result in a distribution 160 of interleaved values concentrated in smaller number of sort order values, such as sort order values "0000," "0001," "0010," and "0011." The reasons raw column values can skew the distribution are many. For example, non-integral datatypes, such as string data types, which are common in real-world data store applications, have no natural mappings to equally-sized integer values (where the same number of bits may be used to interleave from each column). Consider a data warehouse that supports a relational database table with large text columns with thousands of characters or more. The potential size (and/or varying content difference) for such columns would be difficult to encode an arbitrary string value as a compact integer. Just as problematic as the type of data values is the actual skew present in the set of data values stored within a column. Consider a scenario where two 32-bit integer columns A and B are being interleaved, both of which are skewed. In column A, the low-order 16 bits are always 0, and in B the high-order 16 bits are always 0. In such a scenario, when the values from the two columns are inter leaved, all non-zero bits of A will precede all non-zero bits of B, and the values will be sorted such that a query on an individual one of the columns (e.g., A or B) will be able to process efficiently (as few storage locations for each column will not be identified for reading). Skew, such as described in the examples above, occurs frequently in real world data sets.

Figure 1B:
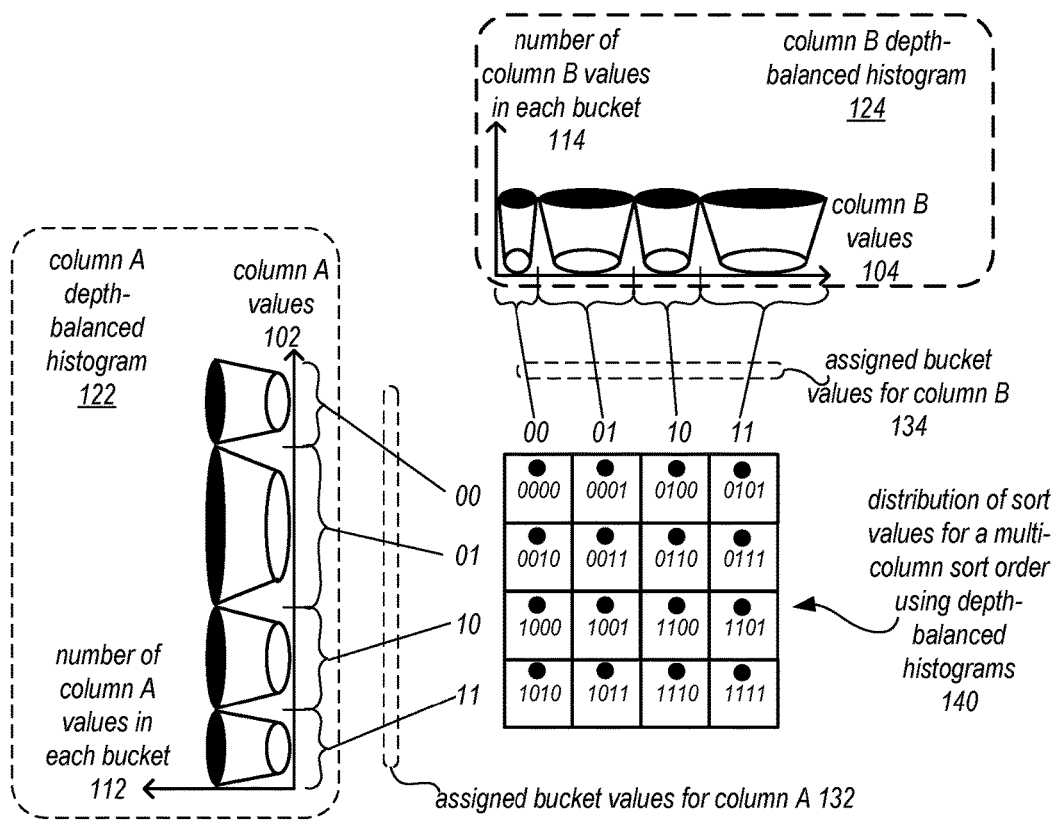
FIG. 1B illustrates balanced distribution of sort order values for a multi-column sort order, according to some embodiments.

Implementing balanced distribution of sort order values for a multi-column sort order may alleviate the skew and other distortions that imbalance distribution of sort values, and thus enhance, the efficiency provided by utilizing a multi-column sort order to service queries. Instead of directly generating multi-column sort order values from the raw column data values, balancing transformations may be applied to eliminate skew and other distortions. FIG. 1B illustrates balanced distribution of sort order values for a multi-column sort order, according to some embodiments.

In various embodiments, data may be received for storage (or is already currently stored) in a database table in a data store. Of the multiple columns in the database table, different ones may be identified for generating a multi-column sort order. Selecting or identifying the columns to be used for generating the multi-column sort order key values may be performed as part of a table creation process, for example, such as by receiving client-specified column identifiers for the columns to be used. Balanced distributions of data values in the columns may be applied so that the resulting multi-column sort order values generated are evenly distributed across the sort order value space, providing selective sort order values that can better discriminate which storage locations are to be accessed to service a query directed to the database table.

For example, as illustrated in FIG. 1B, two the data values in identified columns for the multi-column sort order, column A and column B, may be evaluated to generate respective depth-balanced histograms for the data values in each column. Column A values 102 may be evaluated to generate a depth-balanced histogram 122 for column A. Likewise, column B values 104 may be evaluated to generate column B depth-balanced histograms. Depth-balanced histograms may be histograms where the buckets of the histogram may include a balanced number of entries in each bucket (e.g., the same or near the same number of entries in each bucket). For example, as illustrated in FIG. 1B, the number of column A values in each bucket 112 is the same (or approximately the same). Similarly, the number column B values in each bucket 114 is the same (or approximately the same). To achieve a depth balanced histogram, the range of data values represented by a bucket may vary in order to include a same number of entries (as illustrated by the varying bucket widths of buckets and corresponding ranges for column A values 102 and column B values 104). In order to determine the range of data values for buckets for a depth-balanced histogram, a number of quantiles corresponding to the number of buckets may be calculated. A quantile may be a partition of the data values in a set (e.g., a column) that is equal (or nearly equal). By setting bucket data range values equivalent to include quantiles for the data values of a column, each bucket may have an equal (or near equal) number of entries within the range of data values corresponding to the bucket.

The buckets may be assigned different bucket values, such assigned bucket values for column A 132 or assigned bucket values for column B 134. These assigned bucket values may be used to generate multi-column sort order values for individual entries in the database table, instead of the raw data values of the columns in an entry. In this way, the selectivity of individual bits within the multi-column sort order values may be evenly distributed, allowing query processing to filter out more storage locations that do not have to be read when processing a query. Consider the distribution of sort order values 140 in FIG. 1B utilizing depth balanced histograms. The number of entries represented by each sort order value is evenly distributed, leading to a more efficient number of read operations to access storage locations identified according to the multi-column sort order values.

Different techniques for generating multi-column sort order values based on the assigned bucket values for columns. For example, an interleaving technique or scheme to generate a z-order curve, or other space-filling curve (e.g., a Hilbert curve), may be used to interleave data bits from different column values according to their selectivity. For example, in a z-order curve, such as illustrated in FIG. 1B, the most significant data bit from each column value is interleaved, and then the next most significant, and so on. Take assigned bucket value "10" for column A and assigned bucket value "11" for column B. Interleaving the individual bits of these two values starting with the most significant bit would result in a multi-column sort order value of "1110." FIG. 7, discussed in detail below, provides other examples of interleaving techniques that may be performed to generate multi-column sort order values.

A multi-column sort order value may be generated for each entry in the database table according to the same interleaving technique or scheme. The entries of the database table may then be stored according to a sorted order of the multi-column sort order values in the data store. In this way, when processing queries directed toward the database table, entries with similar multi-column sort order values may be located close together, reducing the number of access requests and other related operations to service queries. For example, entries may be stored in an order of increasing multi-column sort order values. Metadata, such as zone maps or a superblock as discussed below, may be updated to identify the ranges of multi-column sort order values included in each location. When processing queries, the metadata may be accessed to identify the storage locations to access, and thus the entries to evaluate for servicing the query, such as discussed below with regard to FIG. 8.

A Multi-column sort order may grow less efficient over time as entries are added, removed, or modified in the database table. Re-sorting events may be detected, as discussed below with regard to FIG. 10, which may trigger a re-sorting of the database table, generating a new multi-column sort order and storing the entries of the database table according to the new multi-column sort order, in order to account for the changes to the database table.

Please note that the previous description of a data store, depth-balanced histograms, histogram buckets, assigned histogram values, and multi-column sort order values and other illustrated components are a logical illustration and thus are not to be construed as limiting as to the implementation of a data store that performs balanced distribution of sort order values for a multi-column sort order.

This specification begins with a general description of a data warehouse service that implements balanced distribution of sort order values for a multi-column sort order. Then various examples of data warehouse, including different components/modules, or arrangements of components/module that may be employed as part of implementing the storage service are discussed. A number of different methods and techniques to implement balanced distribution of sort order values for a multi-column sort order are then discussed, some of which are illustrated in accompanying flowcharts. Finally, a description of an example computing system upon which the various components, modules, systems, devices, and/or nodes may be implemented is provided. Various examples are provided throughout the specification.

A data storage service, such as a data warehouse service discussed below with regard to FIGS. 2 through 6, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to generating a multi-column sort order for a relational database system by interleaving data bits for selectivity may be equally configured or adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a multi-column sort order may be generated and applied so that entries in the database table are stored according to the multi-column sort order. When queries are received, mapping information, such as may be maintained in a superblock as discussed below may be utilized to locate the data values likely stored in data blocks of the columnar relational database table, which may be used to determine data blocks that do not need to be read when responding to a query.

Figure 2:
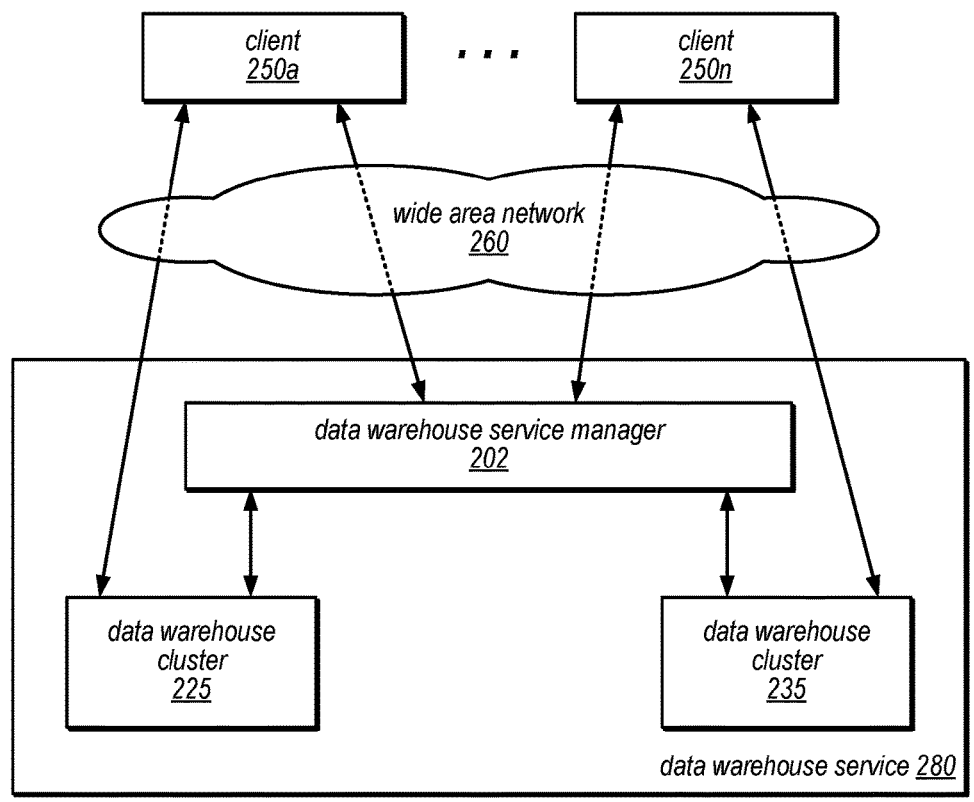
FIG. 2 is a block diagram illustrating an example database warehouse service, according to some embodiments.

As discussed above, various clients (or customers, organizations, entities, or users) may wish to store and manage data using a data management service. FIG. 2 is a block diagram illustrating an example database warehouse service, according to some embodiments. Specifically, data warehouse clusters may respond to store requests (e.g., to write data into storage) or queries for data (e.g., such as a Server Query Language request (SQL) for select data), along with many other data management or storage services.

Multiple users or clients may access a data warehouse cluster to obtain data warehouse services. Clients which may include users, client applications, and/or data warehouse service subscribers), according to some embodiments. In this example, each of the clients 250a through 250n is able to access data warehouse cluster 225 and 235 respectively in the data warehouse service 280. Data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 2000 described below with regard to FIG. 11, configured to send requests to the data warehouse clusters 225 and 235, and/or receive responses from the data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with data warehouse service manager 202.

Clients 250a through 250n may communicate with data warehouse clusters 225 and 235, hosted by data warehouse service 280 using a variety of different communication methods, such as over Wide Area Network (WAN) 260 (e.g., the Internet). Private networks, intranets, and other forms of communication networks may also facilitate communication between clients and data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to data warehouse cluster 225 over WAN 260. Responses or other data sent to clients may be formatted in similar ways.

In at least some embodiments, a data warehouse service, as indicated at 280, may host data warehouse clusters, such as clusters 225 and 235. The data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 2000 in FIG. 11. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4. Clusters may be configured to receive requests and other communications over WAN 260 from clients, such as clients 250a through 250n. A cluster may be configured to receive requests from multiple clients via the network endpoint of the cluster.

In some embodiments, data warehouse service 280 may be implemented as part of a network-based service that allows users to set up, operate, and scale a data warehouse in a cloud computing environment. The data warehouse clusters hosted by the network-based service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, data warehouse service 280 may provide clients (e.g., subscribers to the data warehouse service provided by the data warehouse system) with data storage and management resources that may be created, configured, managed, scaled, and terminated in response to requests from the storage client. For example, in some embodiments, data warehouse service 280 may provide clients of the system with data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Data warehouse service 280 may be implemented by a large collection of computing devices, such as customized or off-the-shelf computing systems, servers, or any other combination of computing systems or devices, such as the various types of devices described below with regard to FIG. 11. Different subsets of these computing devices may be controlled by data warehouse service manager 202. Data warehouse service manager 202, for example, may provide a cluster control interface to clients, such as clients 250a through 250n, or any other clients or users who wish to interact with the data warehouse clusters managed by the data warehouse manager 202, which in this example illustration would be data warehouse clusters 225 and 235. For example, data warehouse service manager 202 may generate one or more graphical user interfaces (GUIs) for storage clients, which may then be utilized to select various control functions offered by the control interface for the data warehouse clusters hosted in the data warehouse service 280.

Figure 3:
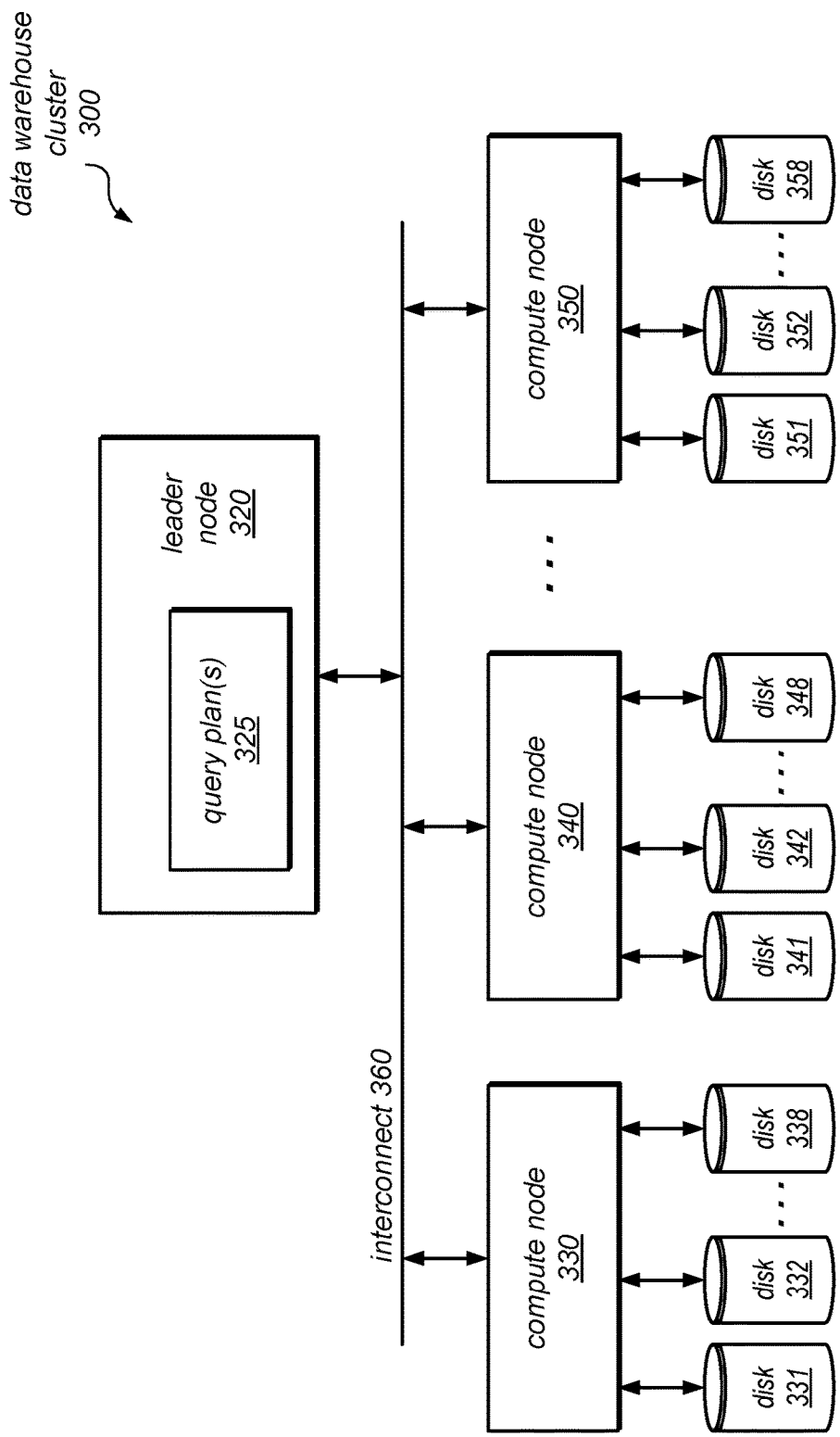
FIG. 3 is a block diagram illustrating an example data warehouse cluster, according to some embodiments.

FIG. 3 is a block diagram illustrating a data warehouse cluster in a data warehouse service, according to one embodiment. As illustrated in this example, a data warehouse cluster 300 may include a leader node 320 and compute nodes 330, 340, and 350, which may communicate with each other over an interconnect 360. Leader node 320 may generate and/or maintain one or more query plans 325 for executing queries on data warehouse cluster 300. As described herein, each node in a data warehouse cluster may include multiple disks on which data blocks may be stored on behalf of clients (e.g., users, client applications, and/or data warehouse service subscribers). In this example, compute node 330 includes disks 331-338, compute node 340 includes disks 341-348, and compute node 350 includes disks 351-358. In some embodiments, a component of the data warehouse cluster (or the data warehouse system of which it is a component) may support load balancing, using any of a variety of applicable load balancing techniques. For example, in some embodiments, leader node 320 may include a load balancing component (not shown).

In at least some embodiments, data warehouse cluster 300 may be implemented as part of the network-based data warehousing service, such as the one described above, and includes a leader node 320 and multiple compute nodes, such as compute nodes 330, 340, and 350. The leader node 320 may manage communications with storage clients, such as clients 250a through 250n discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes (sometimes referred to as storage nodes), may for example, be implemented on servers or other computing devices, such as those described below with regard to computer system 2000 in FIG. 11, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or data structures that indicate data values not stored in a data block may all be stored in the respective entry for a data block. In some embodiments, the unique ID may be generated (and a corresponding entry in the superblock created) by the leader node or by a computing node when the data block is first written in the data warehouse system. In at least some embodiments, an entry in the superblock may be maintained that indicates the range, such as the min and max values, for multi-column sort order values associated with the data values for entries stored in the superblock.

Figure 4:
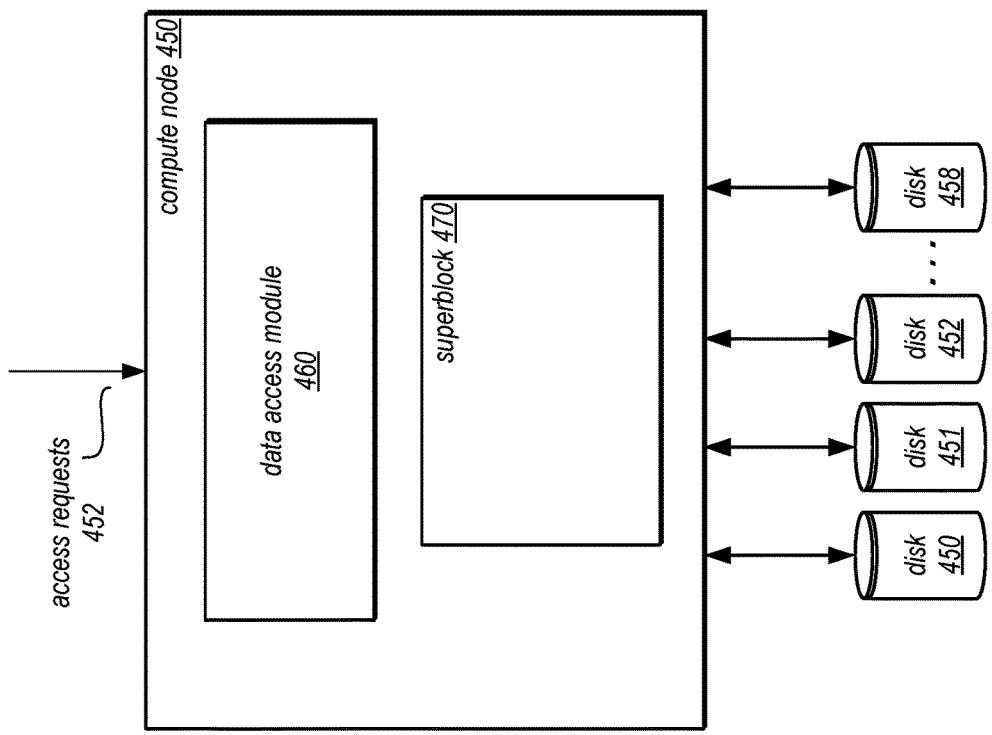
FIG. 4 is a block diagram illustrating an example compute node, according to some embodiments.

FIG. 4 illustrates an example of a compute node, according to some embodiments. Access requests 452, such as the various queries and messages sent to a leader node, such as leader node 320, and sent from a leader node to a compute node, may be received at compute node 450. A data access module 460, such as described in further detail below with regard to FIG. 5, may process access requests, directing reads, writes, and other access operations to disks 450 through 458. Various different hardware and software devices may be used singly or in combination to implement query execution module 460. When processing queries, data access module 460 may examine the entries of for the ranges of multi-column sort order values in the super block for each data block storing data for the database table to identify data blocks to be read in order to service the query, and then read the identified data blocks storing data for the column.

In some embodiments, a compute node 450 may also include a superblock data structure 470, such as the superblock data structure described above, stored locally at the compute node or stored remotely, but accessible to the compute node, which may include respective entries for the data blocks stored on the compute node 450 which store block metadata including multi-column sort order value ranges, as well as other information, for the data blocks. Note, however, that in some embodiments, metadata for data blocks may be stored in multiple different locations, such as in the data block itself, or in other individual data structures. Therefore, the superblock data structure 470 is not intended to be limiting as to the various other structures, locations, methods, or techniques which might be applied to preserve metadata information for the data block.

Figure 5:
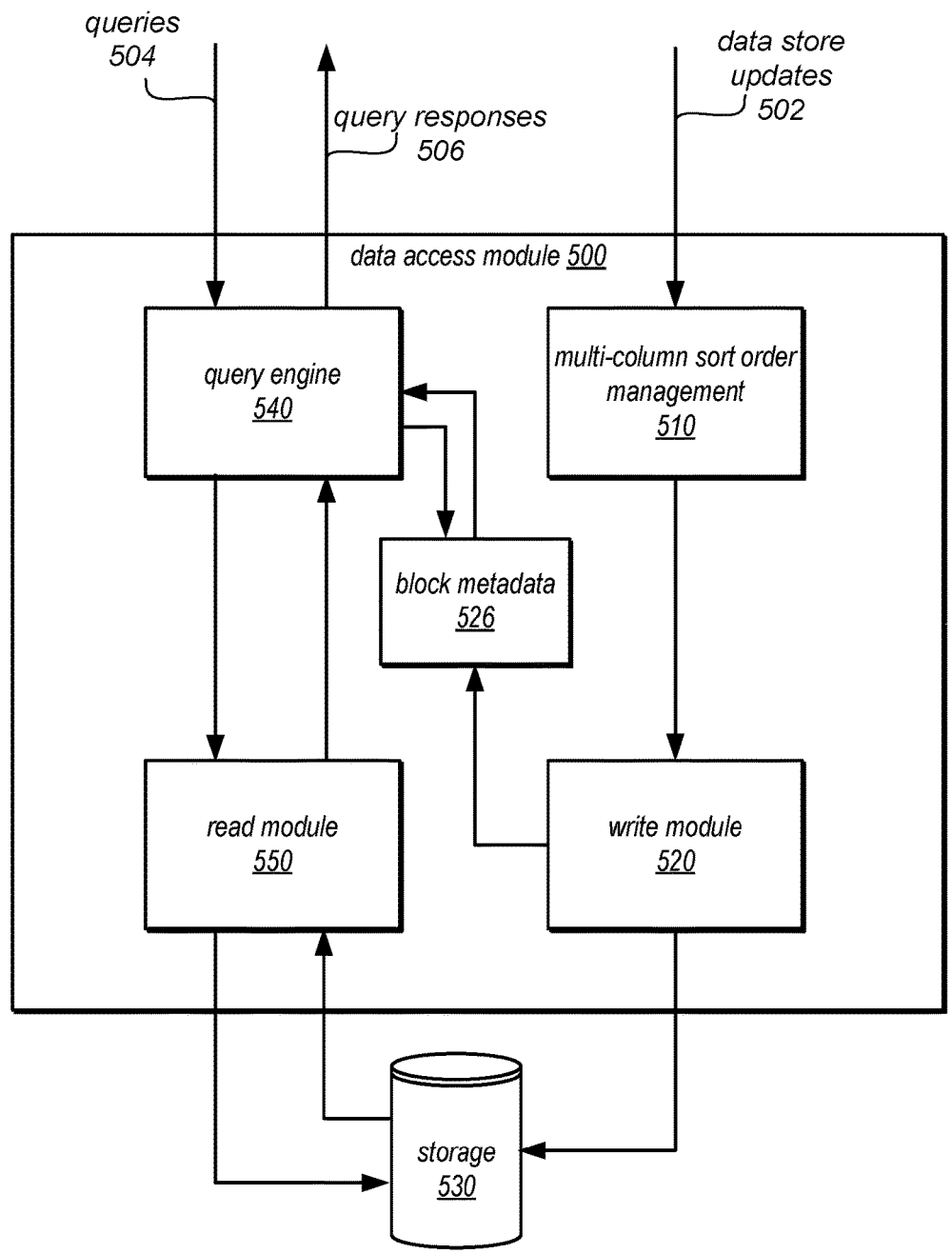
FIG. 5 is a block diagram illustrating an example data access module that implements generating and processing queries according to a multi-column sort order, according to some embodiments.

As discussed above, a compute node may be configured to receive access requests, such as queries, storage operations, and other data management operations. FIG. 5 is a block diagram illustrating an example data access module that implements generating and processing queries according to a multi-column sort order, according to some embodiments. Queries 504 and data store updates 502, or indications of queries or data store requests, may be received as inputs to data access module 500. Data access module 500 may communicate with storage 530, which may store a plurality of data blocks for multiple columns of a columnar database table. Data for the multiple columns may be stored in the data blocks in storage 530, and data access module 500 may be configured to both store this data and read this data from storage.

Portions or all of data access module 500 may be implemented on a compute node, such as compute node 450 described above with regard to FIG. 4. Although depicted in as implemented in a compute node in FIG. 4, data access module 500, or components or modules of data access module 500, such as multi-column sort order management 510 may be implemented in leader node 320, described above with regard to FIG. 3, or some other component or module of the data warehouse service. Various different configurations of hardware and software components may be used to implement the data access module 500 as well as the components or modules illustrated within. Also note that, although different modules or components are illustrated within data access module 500 as one or more distinct modules or devices, these various components may be combined together, located differently, or alternatively configured to implement generating a multi-column sort order by interleaving data bits for selectivity in a columnar relational database table, and therefore, the following description of FIG. 5 is not intended to be limiting as to the various other ways a data access module or similar module or device may be implemented.

Data store updates 502 which may include data to be stored for a columnar relational database table stored in storage 530. For example, the data for storage in a data block in storage 530 may be obtain the data via an Open Database Connectivity (ODBC) and/or Java Database Connectivity (JDBC) driver interface or other component that is configured to receive storage request information and data for storage (e.g., a request to create a relational database table in the data warehouse service). Multi-column sort order management 510 may receive as input the data to be stored for the database table in storage 530. Although not illustrated, in at least some embodiments, data obtained from data blocks in storage may also be received as input at multi-column sort order management 510. For example, a multi-column sort order may be generated for an already stored or maintained columnar relational database table. Thus, the already stored data may also be received as input at the at multi-column sort order management 510 in order to generate a multi-column sort order for the already stored columnar relational database table.

Figure 6:
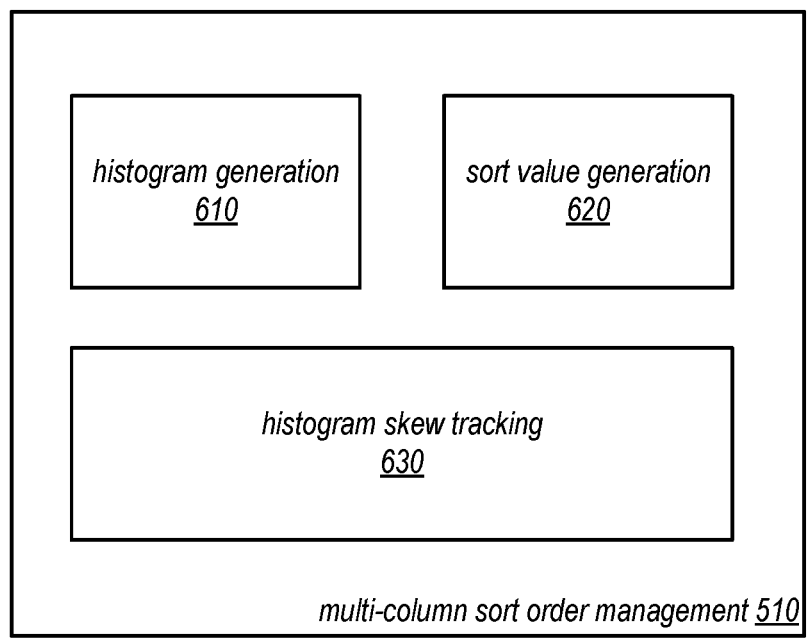
FIG. 6 is a block diagram illustrating an example multi-column sort order key manager that balances distribution of sort order values, according to some embodiments.

Upon receipt of the data to be stored, at multi-column sort order management 510 may generate a multi-column sort order value for the columnar relational database table, balancing distribution of the sort order value with respect to other sort order values within the multi-column sort order. Various techniques and methods for generating a multi-column sort order for a columnar relational database table are discussed below with regard to FIG. 7. FIG. 6 is a block diagram illustrating an example multi-column sort order manager that balances distribution of sort order values, according to some embodiments, that may implement one or more of the various techniques discussed below in FIG. 7.

In at least some embodiments, at multi-column sort order management 510 may implement histogram generation 610. Histogram generation 610 may implement various techniques to generate depth-balanced histograms for columns identified for a multi-column sort order. For example, histogram generation 610 may implement a streaming (or online) approximate quantile generation technique for processing data values for a column being uploaded to the data warehouse service as part of creating a new relational database table so the quantiles, and thus the data ranges for different buckets of the depth-balanced histogram being generated for the column may be quickly determined. In at least some embodiments, histogram generation 610 may select a random sample of column data values and determine approximate quantiles based on the random sample of column data. Histogram generation 610 may also perform exact or non-approximate quantile calculations over the entire set of column data values (e.g., when performing a re-sort order of the relational database table as discussed below with regard to FIG. 10).

Figure 7:
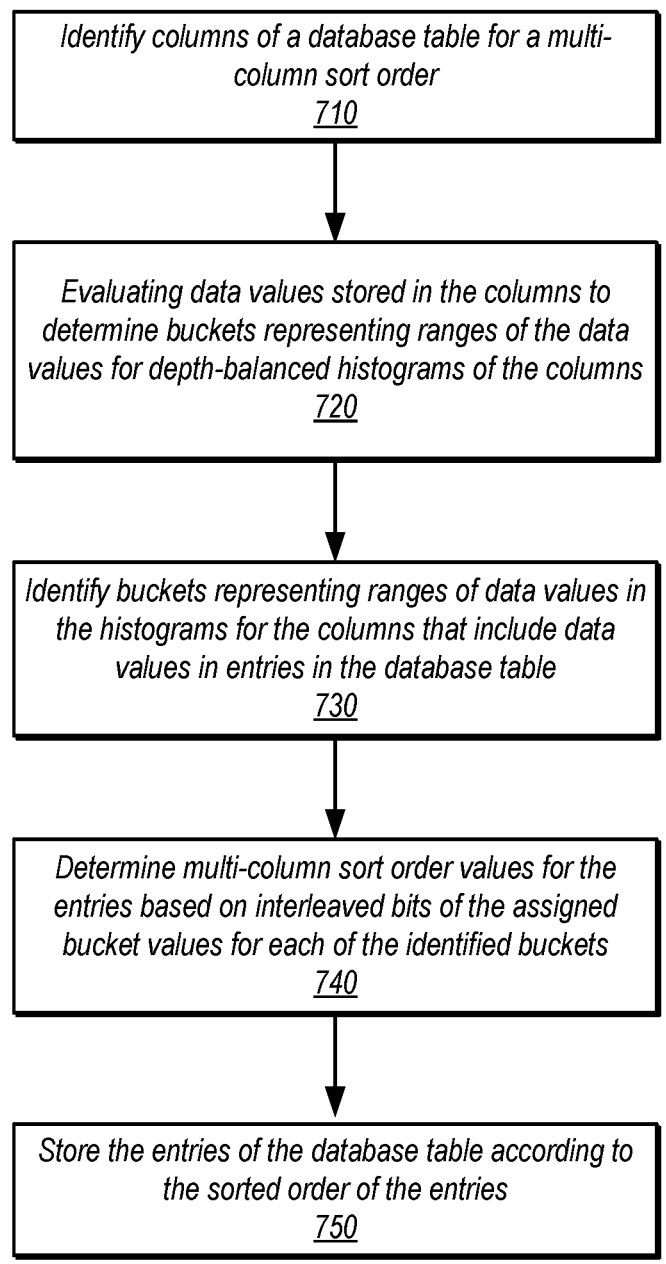
FIG. 7 is a high-level flowchart illustrating methods and techniques to balance distribution of sort order values for a multi-column sort order, according to some embodiments.

Multi-column sort order management 510 may implement sort order value generation 620 to implement the various techniques described below with regard to elements 740 and 750 in FIG. 7. For instance, in some embodiments, sort order value generation 620, may interleave the data bits from assigned bucket values for the buckets identified as including the data values of those in an entry included in the multi-column sort order. Thus, the bucket boundaries or data ranges generated as part of histogram generation 610 may be accessed to generate the multi-column sort order values of entries. The generated sort order value may be used as the multi-column sort order value (which may be a key value for the columnar relational database table, such as a sort key or distribution key). In some embodiments, sort order value generation 620 may receive as input additional data/entries to be stored in a columnar relational database table (e.g., insert requests such as discussed below with regard to FIG. 9). Sort order value generation 620 may generate a multi-column sort order value for the additional entry.

Multi-column sort order management 510 may implement histogram skew tracking 630, which may determine various skew indications for the multi-column sort order generated for a relational database table. For example, the number of entries assigned to each bucket may be tracked. The number of entries may be monitored to determine whether differences between the numbers of entries at each bucket exceeds a re-sort ordering threshold (e.g., which may be determined based on an approximation factor utilized when determining approximate quantiles at histogram generation 610). When new entries are added (or entries are removed), the counts may become indicate skew if the data distribution changes. The difference between bucket counts can be provided to clients of the data warehouse service as indication of the skew of an sort order so that the client may determine when to request a re-sort of the relational database table. For example, the ratio between the largest count of a bucket and the average count of buckets in the histogram of a column may be calculated. In some embodiments, the re-order threshold may trigger an automated re-sorting of the relational database table (which may be requested or managed by multi-column sort order management 510). In some embodiments, the counts of buckets may only be updated for insert requests (excluding operations that modify column data values or delete entries). Inserts may be counted in a transactionally safe way by buffering the updated counts for each bucket and applying them when an insertion request commits.

Multi-column sort order management 510 may store, update, or send the multi-column sort order values generated for the columnar relational database table to write module 520 which may subsequently store the entries in storage 530 according to a sorted order of the multi-column sort order values. For additional entries received for an already existing table, write module 520 may direct storage 530 to store the entry in an unsorted region of storage 530. Block metadata 526 may be aggregated metadata for the blocks in storage 530, such as the superblock data structure 470 described above with regard to FIG. 4. Write module 520 may store multi-column sort order value ranges for data blocks as part of block metadata 526. Alternatively, in some embodiments, block metadata 526 may be distributed in different locations for different blocks, or stored in a location remote from, yet accessible to, the data access module.

A write module 520 may also be implemented by data access module 500 to store the data for data blocks in the data blocks in storage 530. In at least some embodiments, write module 520 may be configured to sort the entries of the columnar relational database table according to the multi-column sort order values for each respective entry and direct the storage 530 to store the columnar relational database table according the sorted order. In some embodiments, write module 520 (or another module or modules, such as the multi-column sort order key generator 130) may be configured to update block metadata 526 with other metadata for the data stored in the data block.

Data access module 500 may also receive queries 504, or indications of queries, such as queries for select data stored in storage 530. For example, a leader node, such as leader node 320 described above with regard to FIG. 3, may receive a query from a storage client, and generate a query execution plan which sends the query to a compute node implementing data access module 500. Data access module 500 may implement a query engine 540 to process and receive the queries. As discussed above queries may be instructions to be executed according to a query plan, but may also be more generally any type of request for data that meets a specified criterion or is generated by a specified process. In some embodiments, a query, or an indication of a query, may include one or more predicate data values that identify select data for processing the query. For example, an SQL query may include predicate data values that specify equality conditions to be met for data to be retrieved, such as "WHERE customer='small' AND customer='medium'." In some embodiments, there may different types of queries. Some types of queries may require filtering on point values (e.g., all records where the state value="Texas"). Other queries may request larger groups of data, such as range queries that filter data based on a range of data values (e.g., all purchase orders for with purchase prices between $1,000 and $10,000). Some queries may indicate data joins that join records from one table in database based on a corresponding value obtained from another database. (e.g., join the records from of a personal database that includes an indication of a particular work department with those records of employee personal information that include the same work department). The previous description of query engine 510 is not intended to be limiting as to the many different techniques and implementations of a query engine. For example, a standard query engine configured to process standard database protocol messages, such as SQL requests, may be implemented, or alternatively, a query engine that processes customized queries, such as those specified by an API may be used.

Figure 8:
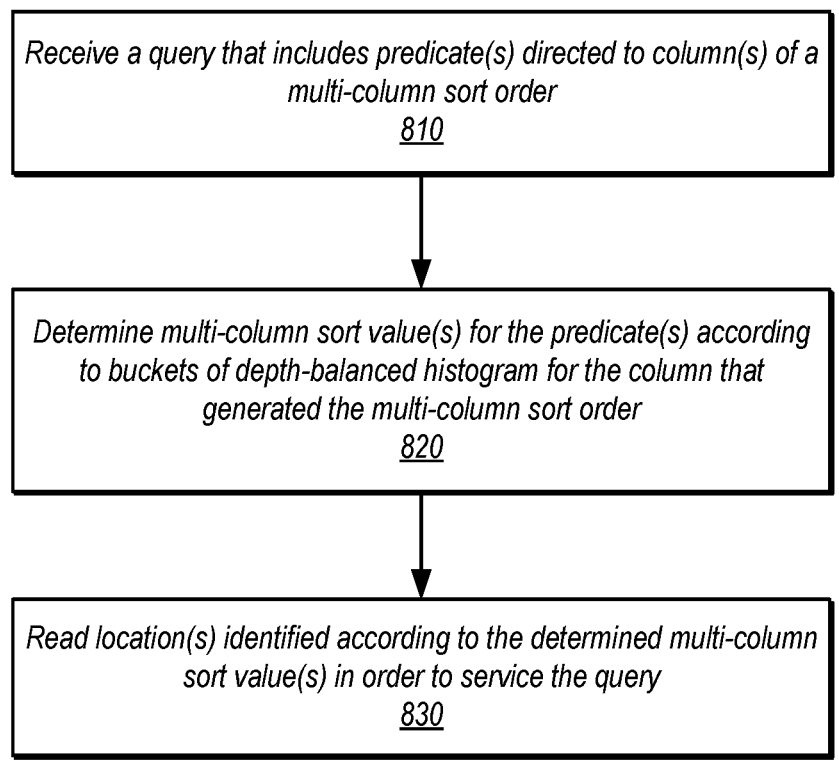
FIG. 8 is a high-level flowchart illustrating methods and techniques to process queries directed toward a relational database with a multi-column sort order utilizing balanced distribution of sort order values, according to some embodiments.

In some embodiments, therefore, a query engine 520 may receive an indication of a query 504 directed to one or more of the columns used to generate the multi-column sort order (including one or more columns used to determine a the sorting columns) for the columnar relational database table in storage 530 for select data. Query engine 540 may evaluate the indication to determine one or more predicate data values based on the same technique to generate the multi-column sort order value (e.g., identifying buckets of the histograms and interleaving assigned bucket values of the identified buckets). For example, if a query is directed toward 3 columns, and indicates selected ranges or values for those three columns (e.g., date=last two months), then sort order values may be generated which create predicate sort order values to be utilized when performing determining which data blocks need to be read. For instance, one or more ranges of sort order values may be indicated as containing the select data. Multi-column sort order value ranges, such as might be stored in block metadata 526 may be evaluated to determine whether a particular data block stores data for entries associated with the predicate sort order values. If the range does not include then predicate sort order values, then data block need not be accessed. Thus, in some embodiments, sort order values may be used to identify data blocks to be ready when servicing the query. FIG. 8, discussed in further detail below, describes some of the various methods and techniques that may be used to process queries using multi-column sort order values, and therefore the above example is not intended to be limiting. Query engine 540 may then direct read module 550 to read the identified data blocks storing data for the columnar relational database table in order service the query.

In at least some embodiments, data access module 500 may include read module 550. Read module 550 may perform read operations to obtain data from storage 530. In some embodiments, read module 550 may be directed by query engine 540 to read certain data blocks for a column of the columnar relational database table and return the read data to query engine 540 for further processing. Query engine 540 may then provide at least some of the data in a query response 506 to a storage client, leader node, or other requesting system or device, or process, filter, manipulate, or otherwise change the data read from storage 530 in accordance with the received query. In at least some embodiments, read module 550 may also transfer data read from storage 530 to a database cache (not illustrated) or other module or device part that provides storage for more frequently accessed data when processing queries 504. Query engine 540 may then access the cache or other module with requesting new read operations of the read module 550. As a variety of different caching techniques for data management and storage systems may be implemented, the previous examples are not intended to be limiting.

Figure 10:
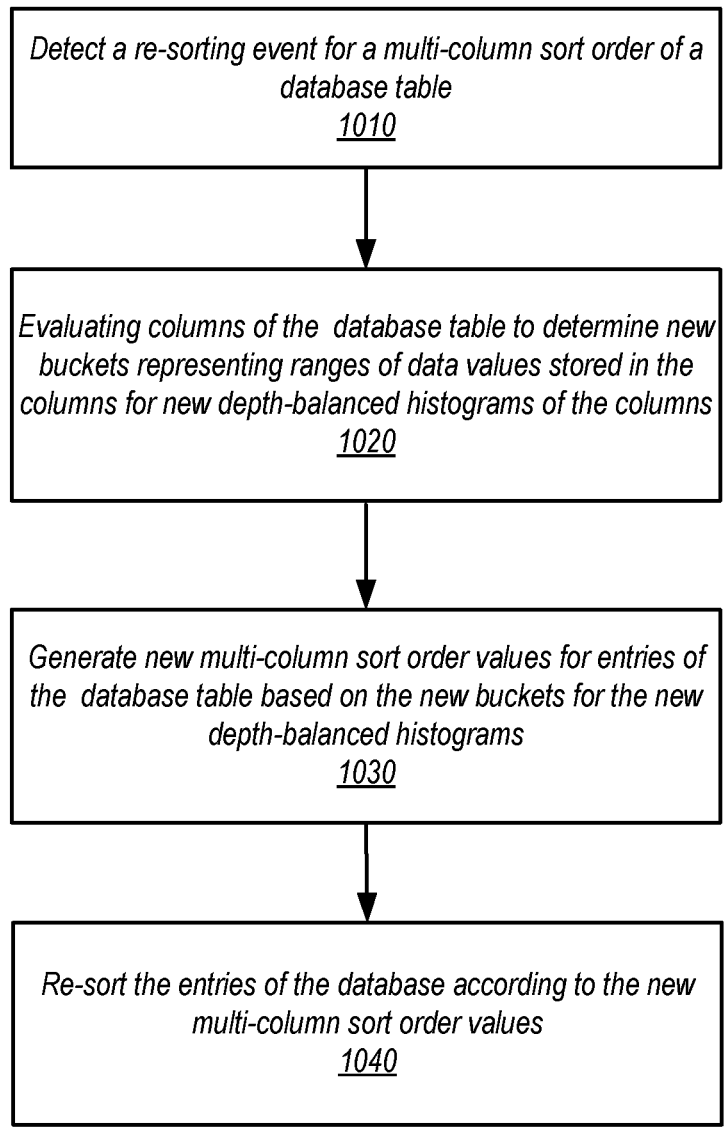
FIG. 10 is a high-level flowchart illustrating methods and techniques to re-sort order a multi-column sort order utilizing balanced distribution of sort order values, according to some embodiments.

Although not illustrated, one of the various components of data access module 500, such as query engine 540 or multi-column sort order management 510, may be configured to detect a re-sort ordering event for a multi-column sort order for a relational database table. FIG. 10 illustrates various methods and techniques that may be implemented to re-sort order a relational database. Multi-column sort order management 510, for instance, may be configured to reevaluate the current data values in columns included in the multi-column sort order, determine new depth-balanced histograms (including new buckets representing new ranges of data values), identify the buckets for entries of the relational database table, interleav the assigned bucket values for the identified buckets to generate new multi-column sort order values, and re-write the entries in storage 530 according to a sorted order of the new multi-column sort order values.

Although FIGS. 2-6 have been described and illustrated in the context of a data warehousing system implementing a columnar relational database table, the various components illustrated and described in FIGS. 2-6 may be easily applied to other data management systems that provide data management and/or storage services for a database table, which may include various other data formats, such as a row-oriented relational database or non-relational database tables. As such, FIGS. 2-6 are not intended to be limited embodiments in a data warehouse cluster, nor limiting a description of a data storage and management cluster. For instance, various embodiments of row-oriented database systems may also implement similar modules or components in order to balance distribution of sort order values in a multi-column sort order.

As has been discussed above, database management systems may be configured to utilize database tables to provide more efficient data management functions. In order to more efficiently perform these functions, sort order values may be distributed in balanced fashion within the multi-column sort order so that query processing operations utilizing the multi-column sort order may efficiently search and identify locations (e.g., data blocks) to read when processing queries. FIG. 7 is a high-level flowchart illustrating methods and techniques to balance distribution of sort order values for a multi-column sort order, according to some embodiments. Various different systems and devices may implement the various methods and techniques described below, either singly or working together. For example, a data access module implementing a multi-column sort order management component, such as multi-column sort order management 510 described above with regard to FIGS. 5 and 6, and a query engine, such as query engine 540, to implement the various methods. Alternatively, a combination of different systems and devices, such as the multiple compute nodes illustrated in FIG. 3 working together, for example, may also perform the below method and techniques, as well as a leader node 320, also illustrated in FIG. 3. Therefore, the above examples and or any other systems or devices referenced as performing the illustrated method, are not intended to be limiting as to other different components, modules, systems, or configurations of systems and devices.

As indicated at 710, columns of a database table may be identified for a multi-column sort order, in various embodiments. Identification of database columns may be determined in response to receiving a client or other request selecting columns to include in a multi-column sort order, in some embodiments. For example, a client, such as client 250 described above in FIG. 2, may send column identifiers as part of a larger create table request or as part of filling in a form other interface that generates a create table request that is processed at a data warehouse system.

As indicated at 720, in various embodiments, the identified columns may be evaluated to determine buckets representing ranges of data values stored in the columns for depth balanced histograms of the columns. Depth-balanced histograms may be histograms where the buckets of the histogram (e.g., the boundaries of values) include a balanced number of entries in each bucket (e.g., the same or near the same number of entries in each bucket). In order to determine the buckets for a depth-balanced histogram, a number of quantiles corresponding to the number of buckets may be calculated. A quantile may be a partition of the data values in a set (e.g., a column) that is equal (or nearly equal). By setting bucket ranges equivalent to a number of quantiles for a column, each bucket may have an equal (or near equal) number of entries with column data values included in the bucket. To determine quantiles of the column, various techniques may be implemented, such as a technique that performs multiple passes or evaluations over all of the data in the column to identify the boundaries of a specified number of quantiles (e.g., 256 quantiles).

In at least some embodiments, approximate quantile calculations may be performed, which may only perform a single pass over the data so that limited space is used (even though the number of entries, and thus number of column values to evaluate may be very large), and may guarantee that each approximate quantile is within ±EN of the actual quantile value. The number of quantiles may be determined based on the number of bits that may be stored to represent the multi-column sort order values (e.g., a 64 bit sort order value may allow for up to for columns and 1023 quantiles determined per column). The range boundaries for the buckets may be maintained as part of the respective histograms for the columns in the multi-column sort order in order to be available for generating multi-column sort order values for the database table.

As indicated at 730, the buckets representing ranges of data values in the histograms for the columns of the multi-column sort order may be identified that include data values of the entry. For example, when identifying buckets for entries of a multi-column sort order being generated for 3 columns, column A, column B, and column C, the values of columns A, B, and C for each entry may be located within one of the respective buckets for the histograms of column A, B, and C. Then bucket values assigned to the identified buckets may be used to create the multi-column sort order values for the entries by interleaving bits of the bucket values.

The creation of multi-column sort order values according to interleaving techniques may be performed in different ways according to various embodiments. For example, in some embodiments, data bits are interleaved in the order of their significance (e.g., such as using a technique to generate a z-order or Morton curve). For example, if the identified columns for a database table are column A and column E, and the value of the entry for column A is 6 (binary value=110) and for column B is 3 (binary value=011), then the bits for the entry of column A and column B may be interleaved according to the most significant bit (i.e. the first bit value). In this example, the first bit from column A's value is 1, after which is added the most significant bit value of B, which is 0, then A's next most significant value 1 is added, then B's next most significant bit is added 1, etc. . . . . The final created sort order value in this example is 101101 (the under lined values represent the bits interleaved from column B). Similar techniques may be applied to greater numbers of selected columns. For instance if 5 columns are identified, then the bits may be interleaved from each of the 5 columns, with the same pattern repeating for each next bit in the value for the entry in the identified column. Along with varying numbers of identified columns, various embodiments may also use different selection patterns from which to interleave data bits. Although in the example given above, column A's value is interleaved before column B's value, the reverse pattern B then A may also be used. Similarly for generating sort order values from larger numbers of identified columns, larger variations in the selection pattern may be employed (e.g., col. 1, then col. 6, then col. 2, and then col. 23). In at least some embodiments, the same pattern is repeated when interleaving data bits from the identified columns. Moreover, as many different interleaving techniques (e.g., other space filling curve techniques, like a Hilbert curve) may be implemented, the previous examples are not intended to be limiting as to various other ways in which a multi-column sort order may be generated for identified columns of a database table.

As indicated at 750, then the entries of the database table may be stored according to the sorted order of the multi-columns sort values, in some embodiments. An increasing value order may be implemented, for instance, so that the entries are stored in data blocks according to an increasing order of multi-column sort order values for the entries.

Metadata describing the storage locations of the database, such as superblock 470 described above with regard to FIG. 4, may indicate the respective multi-column sort order values for data stored in a particular storage location (e.g., data block), such as storing a range of multi-column sort order values. In at least some embodiments, the multi-column sort order value may be used as a distribution key for the database table. A distribution key may be used to determine the storage location of portions of the database table when stored in multiple different locations. For example, as described above in FIG. 3, multiple compute (or storage) nodes may be implemented to store data for a database table. The distribution key may be used to determine different portions of the database table which are to be located and then stored at different compute nodes according to the multi-column sort order value for each respective entry. For example, different ranges of multi-column sort order values, such as 1-2000, 2001-4000, and 4001-6000 may each be stored on different compute nodes. By implementing the multi-column sort order value as the distribution key, some embodiments may improve the performance of queries joining other database tables based on the identified columns used to generate the multi-column sort order.

As noted above, a multi-column sort order may be implemented in order to process queries directed toward one or more of the columns of a database table included in the multi-column sort order. By evaluating multi-column sort order values, queries may be processed or serviced more efficiently, such as by reducing the number of data blocks in a persistent storage device that need to be read, without having to maintain several separate sort order or projections of the database table in order to provide efficient query processing. FIG. 8 is a high-level flowchart illustrating methods and techniques to process queries directed toward a database with a multi-column sort order utilizing balanced distribution of sort order values, according to some embodiments.

As indicated at 810, a query that includes a predicate directed to a column of a multi-column sort order for a database table may be received, in various embodiments. A query predicate, may be a condition, state, or criteria for evaluating the query, such as "WHERE column X=1,000" where column X is included in the multi-column sort order. Note, that a query may include other predicates directed to columns not included in the multi-column sort order.

Upon receipt of the query, the query may be evaluated to determine values for the predicate based on the same technique for balancing distribution of sort order values in the multi-column sort order. For instance, as indicated at 820, a multi-column sort order value for the predicate may be determined according to the buckets of the depth-balanced histogram for the column that generated the multi-column sort order. Similar to the discussion above of generating sort order values for the multi-column sort order with regard to FIG. 7, sort order values may be generated as predicate data values to be searched for with respect to the database table. Consider the scenario where the predicate is directed to one of two different columns included in the multi-column sort order. After identifying a bucket for the predicate, the assigned bucket value for the identified bucket is "6 (110)." As a query predicate is not specified for the other in the vertical dimension, then it may be the determined multi-column sort order value is "1*1*0*."

In some embodiments, metadata describing multi-column sort order values for entries stored in storage locations in persistent storage may be stored/maintained (e.g., metadata may describe the range of multi-column sort order values, such as the min and max multi-column sort order value (e.g., zone boundaries), of entries stored in particular data blocks). As noted above, the entries of the database table are stored, in some embodiments, sorted according to the multi-column sort order value for each entry, allowing for similar data entries (as determined by sort order value) to be located together in data blocks and so that no other storage locations need to be read outside of those identified as containing the appropriate range of multi-column sort order values. Thus, as indicated at 830, locations identified according to the determined multi-column sort order value(s), may then be read in order to service the query. For example, identified data blocks may be a list of block addresses to be sent in access requests to persistent storage devices (or other systems that manage or access persistent storage devices) storing data for the database table. Continuing with the above presented scenario, it may be that only storage locations (e.g., data blocks) with zone boundaries (e.g., recorded in a superblock) overlapping "1*1*0*" may need to be read in order to service the query. Thus, it may be that only data blocks that overlap the following 8 values: (101000, 101001, 101100, 101101, 111000, 111001, 111100, 111101) are read in order to evaluate the entries stored within. Utilizing a multi-column sort order in such a manner will reduce the number of storage locations to be read, saving I/O and processing bandwidth for the database to handle other queries or perform other operations. In the example described above, for instance, the number of storage locations read may be proportional to the square-root of the total number of blocks. Moreover, such an increase in processing efficiency may be consistent regardless of the column in the multi-column sort order along which a search is performed.

Figure 9:
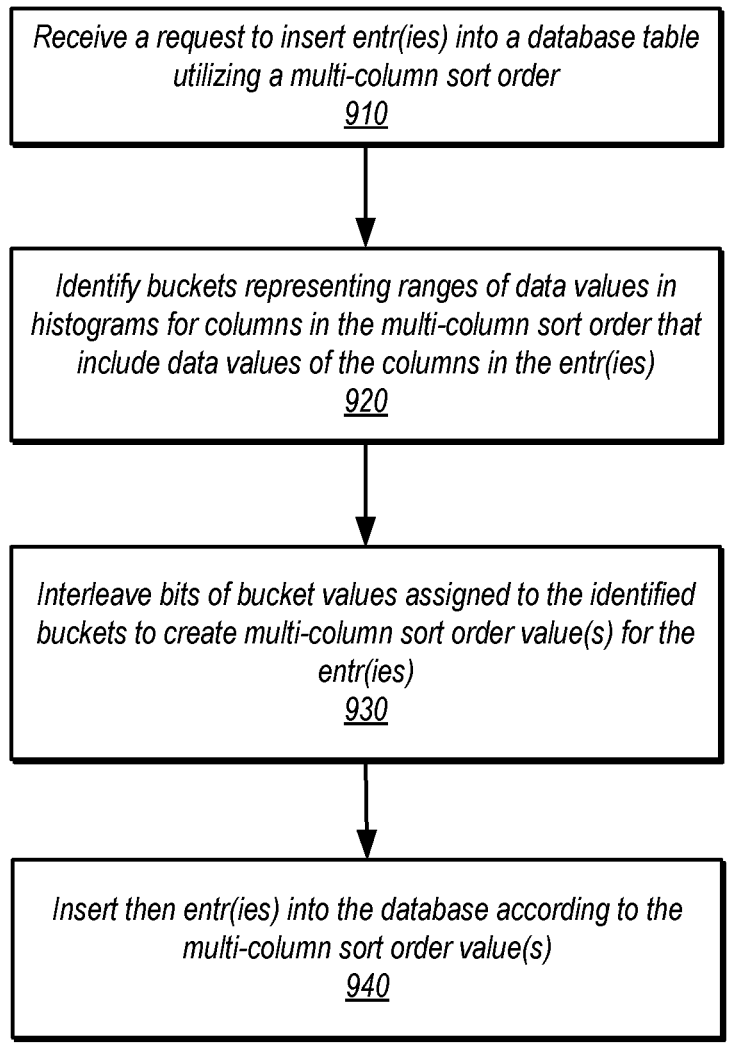
FIG. 9 is a high-level flowchart illustrating methods and techniques to process updates to a relational database with a multi-column sort order utilizing balanced distribution of sort order values, according to some embodiments.

In addition to handling queries utilizing a multi-column sort order that balances distribution of sort order values, the inclusion of new entries in database tables may result in actions to update or manage the storage of new entries according to the multi-column sort order. FIG. 9 is a high-level flowchart illustrating methods and techniques to process updates to a database with a multi-column sort order utilizing balanced distribution of sort order values, according to some embodiments.

As indicated at 910, a request may be received to insert entr(ies) into a database table utilizing a multi-column sort order, in some embodiments. An insert request may include the data values for the various columns of the entry to be inserted Buckets representing ranges of data values in histograms for the columns in the multi-column sort order may be identified that include data values of the columns in the entr(ies), as indicated at 920. Similar to the techniques discussed above with regard to element 730 in FIG. 7, the data values in the entries for those columns included in the multi-column sort order may be compared with the ranges of data values for the buckets until the bucket with a range of data values that includes a data value for column is identified. Once buckets for the data values of the columns in the entries have been identified, then bits of bucket values for the identified buckets, may be interleaved for each of the entries to create the multi-column sort order value(s) for the entr(ies), as indicated at 930. The same interleaving technique (e.g., to apply the same space filling curve) may be applied, as is applied when the multi-column sort order is created.

As indicated at FIG. 9, the entr(ies) may then be inserted into the database according to the multi-column sort order value(s), as indicated at 940. Different databases may perform in-place or out-of-place insertions. In-place insertions may occur when a new entry is stored in a location according to the order of the multi-column sort order value for the new entry so that the entries of the database table remain sorted. Out-of-place insertions may be performed where the new entries are stored in locations for unsorted entries. Such locations may have to be searched/evaluated when processing every query. A vacuum operation or other operation such as a re-sorting operation may then sort the unsorted entries to be included in a sorted order of entries along with those entries that are already sorted. In some embodiments, mapping information (e.g., superblocks) may be updated to identify the storage locations of the new entr(ies) as including entries with the multi-column sort order value(s). In some embodiments, histogram skew tracking, such as discussed above with regard to FIG. 6 may be updated when insertion requests are performed.

As database tables change over time (e.g., due to insertions, deletions, or modifications of entry data values), the multi-column sort order may become less effective in reducing the number of read operations to be performed when processing a query using the multi-column sort order. For instance, many updates to the table inserting new entries with column values that are often located within the same bucket of a histogram, may cause the number of entries to become unbalanced amongst the buckets of the histogram, which in turn causes multi-column sort order values generated for entries with values stored those buckets to be less discriminating (as larger numbers of entries may share the same bucket value). Re-sort ordering of the multi-column sort order may be performed so that the ranges of data represented by buckets of the histograms used to create the multi-column sort order may be adjusted to be depth-balanced again. FIG. 10 is a high-level flowchart illustrating methods and techniques to re-sort a multi-column sort order utilizing balanced distribution of sort order values, according to some embodiments.

As indicated at 1010, a re-sort ordering event for a multi-column sort order of a database table may be detected. Different types of re-sorting events may be detected. For instance, in some embodiments, a re-sorting event may be triggered by a user request to re-sort the database table. Skew indications, such as the number of inserts or updates to column buckets discussed above with regard to FIG. 6, may be provided to users. Users may then determine whether to specifically request that the multi-column sort order for the database table be recreated. In some embodiments, a re-sorting event may be triggered as part of a user request with respect to a database table. For example, a user may submit a vacuum request for a database table to perform a vacuum operation with respect to the database table. As part of performing the vacuum operation, a re-sorting event may be triggered. Re-sorting events may be automatically triggered in some embodiments. For example, skew indications for the multi-column sort order may be monitored with respect to a re-sort threshold (e.g., count the number of entries in each bucket and compare when the difference between a highest number of entries for a bucket and monitor whether an average number of entries in a bucket exceeds a difference threshold).

Once a re-sorting event is detected for the multi-column sort order of the database table, columns in the multi-column sort order of the database table may be evaluated to determine new buckets representing ranges of data values stored in the columns for new depth balanced histograms of the columns, as indicated at 1020. For example, values of the columns in entries that have been added may be considered when performing techniques to calculate quantiles of the column values, which may result in the quantile boundaries shifting in order to maintain a balanced distribution of entries within each quantile. Similarly, the removal of entries in the database table may result in the shifting of quantile boundaries. In some embodiments, a different quantile determination, and thus a different bucket determination technique may be employed for a re-sorting event than was initially performed to create the multi-column sort order. For example, a single pass quantile determination technique, such as discussed above with regard to FIG. 7, may be utilized when initially creating the multi-column sort order, and a double pass quantile determination technique may be performed in response to detecting the re-sorting event.

As indicated at 1030, new multi-column sort order values for entries of the database table may be generated based on the new bucket values for the new depth-balanced histogram. For example, as the ranges of data values represented by buckets may have shifted in order to maintain a depth-balanced histogram for a column, a data value of the column formerly included in one bucket may now be located within the range of data values represented by another bucket. Thus, the bucket value used to generate the multi-column sort order value for the entry including the data value may be changed as the bucket value may be different. The various techniques to generate multi-column sort order values, such as discussed above with regard to FIGS. 1 and 7, may be performed. Once the new multi-column sort order values have been generated, then the entries of the database may be resorted according to the new multi-column sort order values, as indicated at 1040. For example, a process may mark all entries as unsorted and perform a technique to re-order and thus rewrite the entries in storage locations according to an increasing order of the new multi-column sort order values. As a result it may be that the storage locations of some entries may change (e.g., moving entries from one data block to another), while other entries may stay in the same storage locations.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of balanced distribution of sort order values for a multi-column sort order of a database table as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Figure 11:
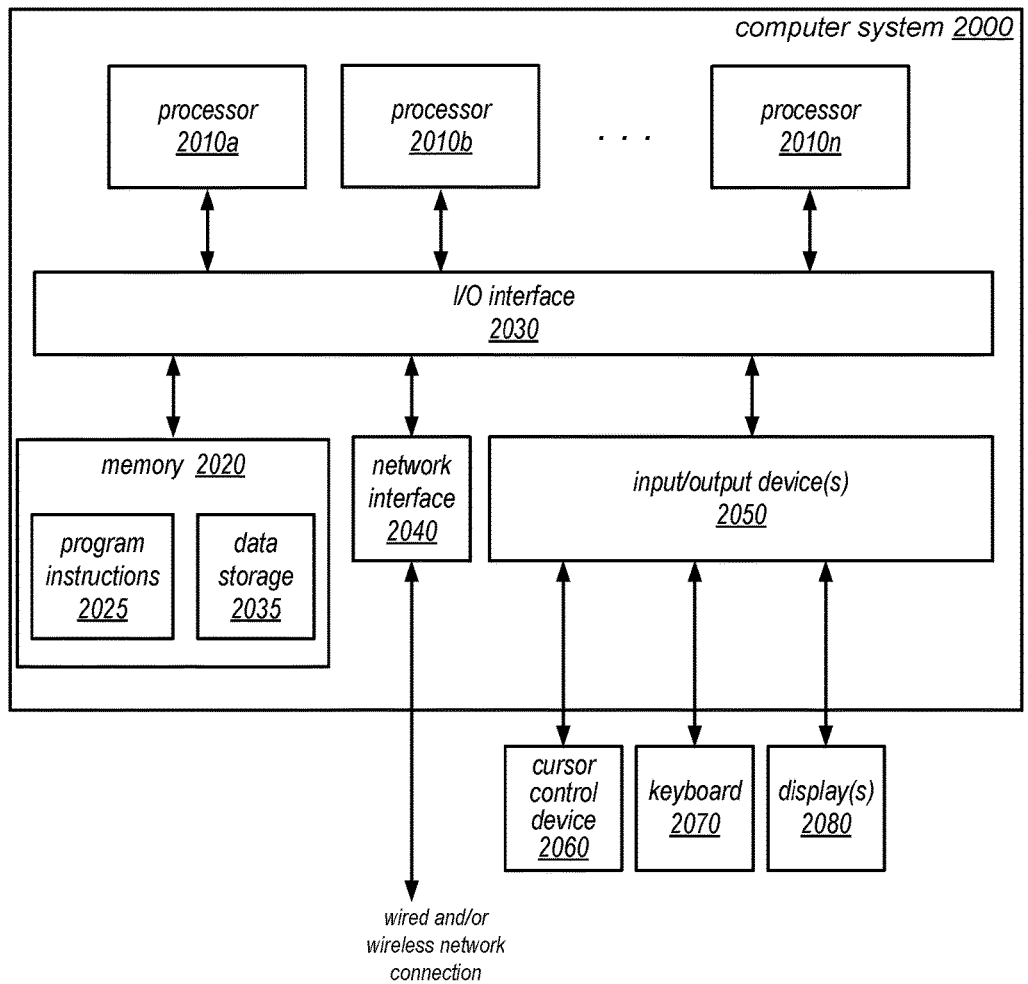
FIG. 11 illustrates an example system configured to implement the various methods, techniques, and systems described herein, according to some embodiments.

As shown in FIG. 11, memory 2020 may include program instructions 2025, configured to implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more storage nodes, respectively comprising at least one processor and a memory, that implement a data store;
   the data store, configured to:
      identify a plurality of columns in a database table for a multi-column sort order of the database table;
      evaluate data values in the plurality of columns to determine buckets for respective depth-balanced histograms for individual ones of the columns, wherein the buckets of the respective histograms represent ranges of the data values in the columns, wherein the buckets are assigned respective bucket values;
      identify those buckets representing ranges of the data values in the respective histograms for the columns that include the data values of the plurality of columns in the entries;
      generate multi-column sort order values for the entries of the database table according to interleaved bits of the assigned bucket values for each of the identified buckets for the entries; and
      store the entries of the database table according to a sorted order of the multi-column sort order values for the entries.

2. The system of claim 1, wherein the data store is further configured to:
   receive a query that includes a predicate directed to one of the columns in the multi-column sort order;
   determine a multi-column sort order value for the predicate according to the buckets for the respective depth-balanced histogram of the one column; and
   read one or more locations in the data store identified according to the determined multi-column sort order value for the predicate to evaluate entries stored at the one or more locations to service the query.

3. The system of claim 1, wherein a plurality of additional entries are inserted into the database table, and wherein the plurality of storage nodes are further configured to:
   detect a re-sorting event for the multi-column sort order of the database table;

in response to the detection of the re-sorting event:
evaluate the data values in the plurality of columns to determine new buckets for new respective depth-balanced histograms for individual ones of the columns, wherein the evaluation includes the data values in the columns of the additional entries;
identify those new buckets representing ranges of the data values in the new respective histograms for the columns that include the data values in the plurality of columns of the entries and the additional entries;
generate new multi-column sort order values for the entries and the additional entries of the database table according to interleaved bits of the assigned bucket values for each of the identified buckets for the entries and the additional entries; and
store the entries and the additional entries of the database table according to a sorted order of the new multi-column sort order values for the entries and the additional entries.

4. The system of claim 1, wherein the data store is a network-based data warehouse service, wherein the database table is stored at the data warehouse service on behalf of a client of the data warehouse service, and wherein the database table is stored in a column-oriented format at different ones of the plurality of storage nodes.

5. A method, comprising:
performing, by one or more computing devices:
identifying a plurality of columns in a database table for a multi-column sort order for the database table;
evaluating data values in the plurality of columns to determine buckets for respective depth-balanced histograms for individual ones of the columns, wherein the buckets of the respective histograms represent ranges of the data values, wherein the buckets are assigned respective bucket values;
generating multi-column sort order values for entries of the database table, wherein generating a multi-column sort order value for an entry comprises:
identifying those buckets representing ranges of data values in the respective histograms for the columns that include data values of the plurality of columns in the entry;
determining the multi-column sort order value for the entry based, at least in part, on interleaved bits of the assigned bucket values for each of the identified buckets; and
storing the entries of the database table according to a sorted order of the multi-column sort order values for the entries.

6. The method of claim 5, further comprising:
receiving a request to insert an additional entry into the database table;
performing the generating the multi-column sort order value for the additional entry; and
inserting the additional entry into the database table according to the multi-column sort order value generated for the additional entry.

7. The method of claim 5, wherein a plurality of additional entries are inserted into the database table, and wherein the method further comprises:
detecting a re-sorting event for the multi-column sort order of the database table;
in response to detecting the re-sorting event:
evaluating the data values of the plurality of columns to determine new buckets for new respective depth-balanced histograms for individual ones of the columns, wherein the evaluation includes the data values in the columns of the additional entries;
identifying those new buckets representing ranges of data values in the new respective histograms for the columns that include the data values of the plurality of columns in the entries and the additional entries;
generating new multi-column sort order values for the entries and the additional entries of the database table according to interleaved bits of the assigned bucket values for each of the identified buckets for the entries and the additional entries; and
re-sorting the entries and the additional entries of the database table according to the new multi-column sort order values for the entries such that the entries and the additional entries of the database table are stored according to a sorted order of the new multi-column sort order values.

8. The method of claim 7, further comprising:
based, at least in part, on the additional entries inserted into the database, calculating a skew indication for the multi-column sort order; and
determining that the skew indication exceeds a re-sort ordering threshold for the multi-column sort order to automatically trigger the re-sort ordering event for the multi-column sort order.

9. The method of claim 7, wherein the re-sort ordering event is triggered as part of a vacuum operation to reclaim storage space for one or more deleted entries in the database table.

10. The method of claim 5, wherein evaluating the plurality of columns to determine buckets for respective depth-balanced histograms evaluates a sample of data values from the columns.

11. The method of claim 5, wherein the database table is a non-relational database table.

12. The method of claim 5, further comprising:
receiving a query that includes a predicate directed to one of the columns in the multi-column sort order;
determining a multi-column sort order value for the predicate according to the buckets for the respective depth-balanced histogram of the one column; and
reading one or more storage locations maintaining the database table that are identified according to the determined multi-column sort order value for the predicate to evaluate entries stored at the one or more locations to service the query.

13. The method of claim 5, wherein the database table is stored as part of a network-based data warehouse service, and wherein the method further comprises:
receiving a request to create the database table from a client of the data warehouse service, wherein the request indicates the columns for the multi-column sort order; and
wherein the identifying, the evaluating, the generating, and the storing are performed in response to receiving the request to create the database table.

14. A non-transitory, computer-readable storage medium, storing program instructions that when executed by one or more computing devices cause the one or more computing devices to implement:
identifying a plurality of columns in a database table for a multi-column sort order of the database table;
evaluating data values in the plurality of columns to determine buckets for respective depth-balanced histograms for individual ones of the columns, wherein the buckets of the respective histograms represent ranges of the data values, wherein the buckets are assigned respective bucket values;

determining those buckets representing ranges of data values in the respective histograms for the columns that include the data values of the plurality of columns in the entries;

generating multi-column sort order values for the entries of the database table according to interleaved bits of the assigned bucket values for each of the determined buckets for the entries; and storing the entries of the database table according to a sorted order of the multi-column sort order values for the entries.

15. The non-transitory, computer-readable storage medium of claim 14, wherein a plurality of additional entries are inserted into the database table, and wherein the program instructions cause the one or more computing devices to further implement:

detecting a re-sorting event for the multi-column sort order of the database table;

in response to detecting the re-sorting event:

evaluating the data values in the plurality of columns to determine new buckets for new respective depth-balanced histograms for individual ones of the columns, wherein the evaluation includes data values in the columns of the additional entries;

identifying those new buckets representing ranges of data values in the new respective histograms for the columns that include the data values of the plurality of columns in the entries and the additional entries;

generating new multi-column sort order values for the entries and the additional entries of the database table according to interleaved bits of the assigned bucket values for each of the identified buckets for the entries and the additional entries; and storing the entries and the additional entries of the database table according to a sorted ordering of the new multi-column sort order values for the entries and the additional entries.

16. The non-transitory, computer-readable storage medium of claim 15, wherein the program instructions cause the one or more computing devices to further implement:

based, at least in part, on the additional entries inserted into the database, determining a skew indication for the multi-column sort order;

providing the skew indication for the multi-column sort order to a client; and receiving a request to request to re-sort the database table from the client, wherein receipt of the request to re-sort triggers the re-sorting event.

17. The non-transitory, computer-readable storage medium of claim 14, wherein the database table is a relational database table.

18. The non-transitory, computer-readable storage medium of claim 14, wherein the program instructions cause the one or more computing devices to further implement:

receiving a query that includes a predicate directed to one of the columns in the multi-column sort order;

determining a multi-column sort order value for the predicate according to the buckets for the respective depth-balanced histogram of the one column; and reading one or more storage locations maintaining the database table that are identified according to the determined multi-column sort order value for the predicate to evaluate entries stored at the one or more locations to service the query.

19. The non-transitory, computer-readable storage medium of claim 14, wherein the program instructions cause the one or more computing devices to further implement:

receiving a request to insert an additional entry into the database table;

performing the determining and the generating to generate a multi-column sort order value for the additional entry; and inserting the additional entry into the database table according to the multi-column sort order value generated for the additional entry.

20. The non-transitory, computer-readable storage medium of claim 14, wherein, in generating the multi-column sort order values for the entries of the database table, the program instructions cause the one or more computing devices to implement interleaving the bits of the assigned bucket values for each of the determined buckets for the entries according to a z-order space filling curve.

* * * * *